United States Patent [19]

Onozuka et al.

[11] Patent Number: 5,157,433
[45] Date of Patent: Oct. 20, 1992

[54] METHOD AND APPARATUS FOR CONTROLLING CONTINUOUS PHOTOGRAPHY

[75] Inventors: Haruo Onozuka; Junichi Iwamoto; Takao Umetsu; Michihiro Shiina, all of Saitama, Japan

[73] Assignee: Fuji Photo Film Co., Ltd., Kanagawa, Japan

[21] Appl. No.: 712,483

[22] Filed: Jun. 10, 1991

[30] Foreign Application Priority Data

Jun. 8, 1990 [JP] Japan .................. 2-148754

[51] Int. Cl.⁵ .......................... G03B 13/36
[52] U.S. Cl. ............... 354/400; 354/195.1; 354/173.1; 354/204
[58] Field of Search .......... 354/400, 195.1, 173.1, 354/204

[56] References Cited

U.S. PATENT DOCUMENTS

| | | | |
|---|---|---|---|
| 4,295,715 | 10/1981 | Breen | 354/400 |
| 4,360,258 | 11/1982 | Hashimoto | 354/195.1 |
| 4,401,378 | 8/1983 | Hirohata et al. | 354/195.1 |
| 4,426,145 | 1/1984 | Hashimoto | 354/195.1 |
| 4,601,563 | 7/1986 | Miyawaki et al. | 354/195.1 |
| 4,695,144 | 9/1987 | Yoshino et al. | 354/400 |
| 4,702,583 | 10/1987 | Yoshino et al. | 354/400 |
| 4,728,979 | 3/1988 | Akitake et al. | 354/400 |
| 4,868,596 | 9/1989 | Ishida et al. | 354/400 |
| 4,918,480 | 4/1990 | Hori | 354/400 |
| 5,083,148 | 1/1992 | Tsuboi | 354/400 |

*Primary Examiner*—Russell E. Adams
*Attorney, Agent, or Firm*—Young & Thompson

[57] ABSTRACT

Continuous photography control for a camera wherein an autofocus system is provided, and a motor is used commonly to move a taking lens for focusing and to open and close a shutter for exposure. When a mode switch is operated to set a continuous photography mode wherein plural exposures are continuously performed, the motor is driven to move the taking lens from an initial position into an in-focus position that is determined by the autofocus system and, thereafter, to open and close the shutter a selected number of times while maintaining the taking lens in the in-focus position. The taking lens is returned to the initial position after the selected number of exposures are performed. Alternatively, when another mode switch is operated to set a photography mode wherein only a single exposure is performed per one depression of the shutter button, then the taking lens is moved from the initial position to the in-focus position; the shutter is opened and closed only once; and then the taking lens is moved back to the initial position.

14 Claims, 5 Drawing Sheets

METHOD AND APPARATUS FOR CONTROLLING CONTINUOUS PHOTOGRAPHY

BACKGROUND OF THE INVENTION

The present invention relates to a method and apparatus for controlling continuous photography by a camera, and in particular to a camera in which a common motor is used to drive a taking lens for focusing as well as to release a shutter.

In order to make it possible for anyone to enjoy photography at ease, there have been provided such cameras that have an automatic exposure (AE) system, an autofocus (AF) system, an automatic film advancing system, and other functions. For the same reason, these cameras are often formed as inexpensive compact cameras. Thanks to these systems and functions, it is necessary only to direct the camera toward a subject and to depress a release button, whereupon the camera is automatically focused on the subject, makes an exposure at an appropriate exposure value depending on the present subject brightness and, thereafter, advances the film by one frame to position an unexposed frame in place of the exposed frame in an exposure station.

In this type of compact camera, there is usually a motor adapted to drive as many parts as possible so as to reduce the weight and volume of the camera. For example, in a variable focal length camera such as a dual focal length camera or a zoom camera, a first motor is used not only to change the focal length of the taking lens, but also to transport the film. A second motor, a stepping motor for instance, is used to move the taking lens from an initial position into an in-focus position for focusing and, thereafter, to open and close the shutter to make an exposure.

However, a problem arises in the above-described camera using a common motor not only for focusing but also for exposure, when the camera is required to perform continuous photography, that is, when the camera is required to take plural pictures in rapid succession. Namely, in the above-described camera, the stepping motor is actuated upon depression of a release button, thereby at first moving the taking lens along the optical axis from the initial position into an in-focus position, and thereafter driving the shutter blade to open and then close so as to make an exposure. A series of these shutter release operations is terminated after moving the taking lens back to the initial position. Because this sequence is intended to move the taking lens back and forth for each exposure, if a plurality of pictures were taken successively by repeating the sequence, the speed of taking would be slow.

In order to perform continuous photography at a high speed, it would be possible to use individual motors for focusing and for driving the shutter blade, but this solution would be disadvantageous from the standpoint of lightness and compactness of the camera.

SUMMARY OF THE INVENTION

To solve the above problems, the present invention provides a method and apparatus for high speed continuous photography for a camera having an autofocus system and a motor which is used to move a taking lens from an initial position to an in-focus position that is determined based on subject distance data detected by the autofocus system and, thereafter, to open and close a shutter blade, the taking lens being returned by the same motor to the initial position after the shutter blade actuation. When a continuous photography mode is selected by operating a switch, the shutter blade is opened and closed an appropriate number of times following the focusing of the taking lens before the taking lens is returned to the initial position.

BRIEF DESCRIPTION OF THE DRAWINGS

Other objects, features and advantages of the present invention will become apparent from the following description when read in conjunction with the accompanying drawings, wherein.

DETAILED DESCRIPTION OF THE PREFERRED EMBODIMENTS

Figure 1:
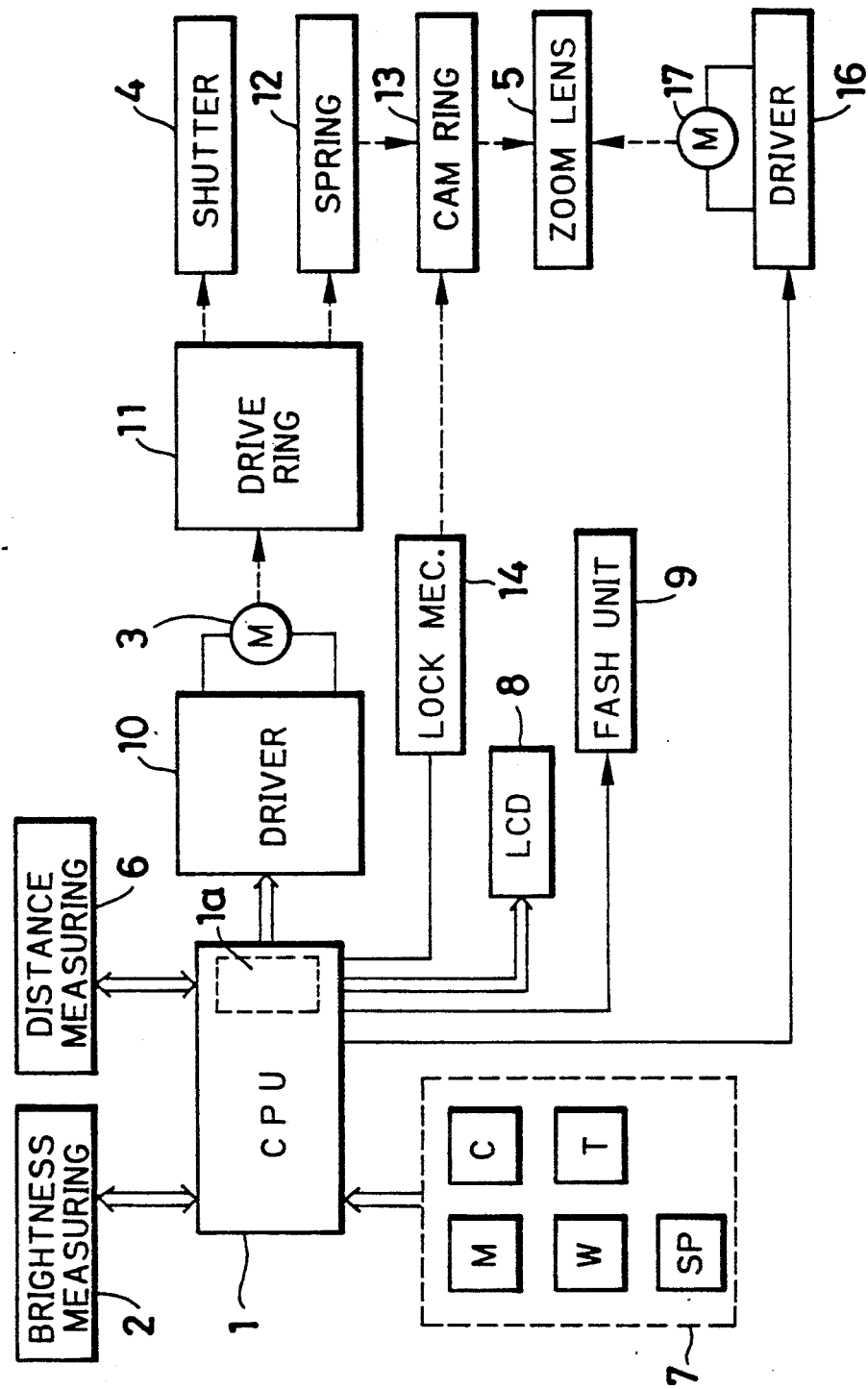
FIG. 1 is a block diagram showing the circuitry of a camera embodying the present invention.

A camera, for instance a zoom camera, embodying the invention is comprised as shown in FIG. 1, in which a CPU 1 is provided as the central portion. The CPU 1 is supplied with subject brightness data from a brightness measuring section 2. Based on the subject brightness data and other parameters such as film speed, the CPU 1 calculates an exposure value based on which the CPU 1 determines whether a flash is necessary, and then determines an appropriate shutter speed. The shutter speed is converted into a step number ST2 of a stepping motor 3 required to open a program shutter 4 by an amount corresponding to the decided shutter speed. The stepping motor 3 is used not only to open and close the shutter 4, but also to move a zoom lens 5 as the taking lens of the camera from a predetermined initial position into an in-focus position as well as to return the lens 5 to the initial position. The in-focus position is determined by the CPU 1 based on subject distance data detected by a distance measuring section 6. The in-focus position is also converted into a step number STI of the stepping motor 3.

A switch unit 7 includes a main switch M for power supply, a release switch SP cooperating with a shutter button, a wide-angle switch W for changing the focal length of the zoom lens 5 toward a wide-angle or short-focal-length region, a telephoto switch T for changing the focal length toward a telephoto or long-focal-length region, a continuous mode switch C for setting and resetting a continuous photography mode, and optionally other switches. In this embodiment, the wide-angle switch W and the telephoto switch T are used also to set the number of exposures to be performed continuously upon a shutter release operation in the continuous photography mode. Binary signals from these switches are read by the CPU 1. The CPU 1 outputs display data to a liquid crystal display (LCD) 8, so that the LCD 8 displays information about the present condition of the camera. The CPU 1 is further connected to a flash unit 9.

The CPU 1 drives the stepping motor 3 at a constant speed through a driver 10, thereby to rotate a drive ring 11. The rotation of the drive ring 11 is transmitted through a spring 12 and a cam ring 13 to the zoom lens 5, so that at least a lens group thereof that has a focusing function is moved in the optical axis direction. Upon driving the motor 3 for focusing, the CPU 1 actuates a lock mechanism 14 so as to stop the focusing motion of the zoom lens 5. Furthermore, the CPU 1 drives the shutter 4 having a shutter drive ring and a shutter blade through the driver 10 and the drive ring 11.

On the other hand, a motor 16 is used to move another lens group of the zoom lens 5 along the optical axis direction so as to change the focal length according to the operation of the telephoto switch T or the wide-angle switch W. It is to be noted that the zoom camera may be replaced by a dual focal length camera.

The operation of the above camera will now be described with reference to FIGS. 2 to 5.

Figure 2:
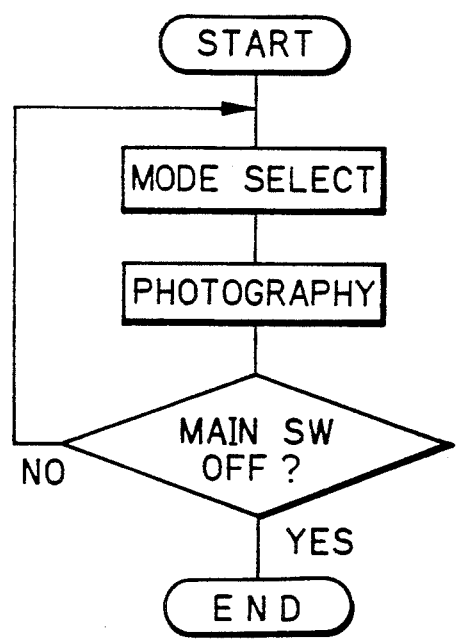
FIG. 2 is a time chart explaining the operation of the camera.

As shown in FIG. 2, when the main switch is turned on, a mode selection procedure is executed prior to a photography procedure. Unless the main switch is turned off, the camera stands by awaiting for the execution of these procedures again. During such stand-by, the CPU 1 monitors the switching condition of the switch unit 7 at constant intervals, and executes the processing upon actuation of switches of the switch unit 7. It is to be noted that the camera is always set in a normal mode immediately after the main switch M is turned on, and when the main switch is turned off, all the data and instructions inputted during the preceding processing are cleared. In the normal mode, one exposure is performed upon each depression of the shutter button.

Figure 3:
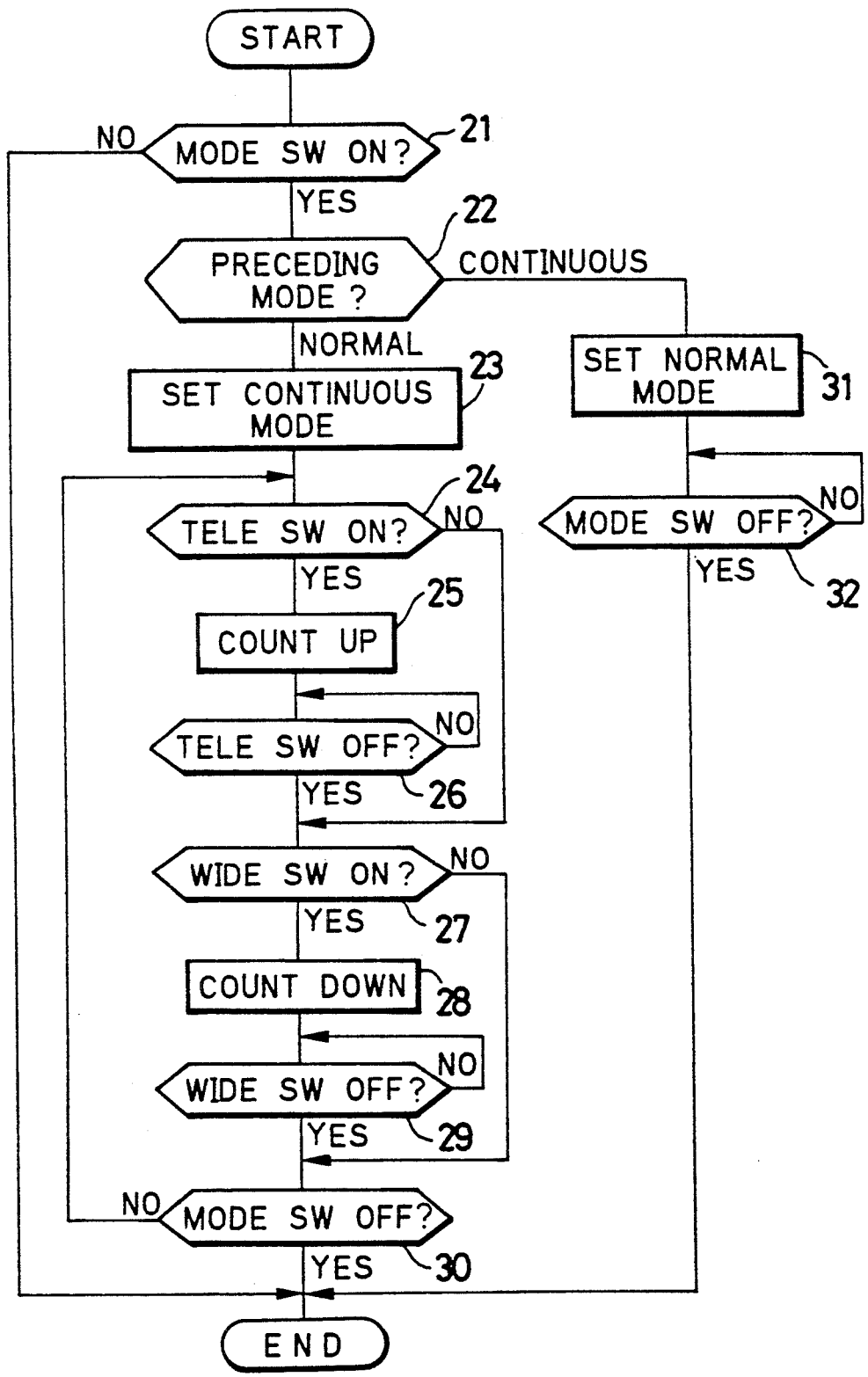
FIG. 3 is a flow chart of the principal operation of the camera.

Referring to FIG. 3 showing an example of a sequence for selecting the continuous photography mode, at first it is determined whether the continuous mode switch C is turned on (step 21). As described above, at the instant the main switch M is turned on, the camera is in the normal mode and the continuous mode switch C is off. Unless the continuous mode switch C is turned on after the mains witch M is turned on, the camera is maintained in the normal mode. When the continuous mode switch C is turned on, it is determined which mode has been set (step 22). In case the continuous mode switch is firstly turned on after the main switch M is turned on, because the normal mode has been set, the continuous photography mode is set upon the first actuation of the continuous mode switch C (step 23). If the continuous mode switch C is actuated twice, since the continuous photography mode has been set in step 22, the camera is set in the normal mode (step 31). In the same way, if the preceding mode is the continuous photography mode, the camera is set in the normal mode (step 31) upon actuation of the continuous mode switch C. That is, the continuous photography mode is alternately set and rest upon each actuation of the continuous mode switch C. After setting the normal mode, and when it is determined that the continuous mode switch C is turned off (step 32), the camera returns to the stand-by condition.

After the continuous photography mode is set in step 23, it is determined whether the telephoto switch T is turned on (step 24). It is to be noted that, so long as the continuous mode switch is turned on, the telephoto switch T cannot function as the focal length changing switch, but serves instead to increase the number of exposures to be performed during continuous photography. Therefore, if it is determined that the telephoto switch T is turned on in step 24, the count of a counter in the CPU 1 that corresponds to the number of continuous exposures is counted up by one increment from a predetermined value, three, for instance. Thereafter, when the telephoto switch T is turned off, it is then determined whether the wide-angle switch W is turned on (steps 26 and 27). If the telephoto switch T is not turned on in step 24, the sequence proceeds directly to step 27.

Also the wide-angle switch W cannot serve to change the focal length so long as the continuous mode switch C is turned on, but rather serves to decrease the number of continuous exposures. Therefore, if it is determined that the wide-angle switch W is turned on in step 27, then the counter in the CPU is counted down by one decrement from the predetermined value. Thereafter, when the wide-angle switch W is turned off, it is determined whether the continuous mode switch C is turned off.

So long as the continuous mode switch C is turned on, so as to set the continuous photography mode, upon each actuation of the telephoto switch T or the wide-angle switch W, the number of continuous exposures is counted up or down by one increment or decrement from the preceding number, respectively. As will be obvious from the above description, if neither telephoto switch T nor wide-angle switch W is turned on while the continuous mode switch C is turned on, then the number of continuous exposures is set at the predetermined value, e.g. three. When the continuous mode switch C is turned off, the subroutine of FIG. 3, that is, the mode selecting procedure is terminated.

Figure 4:
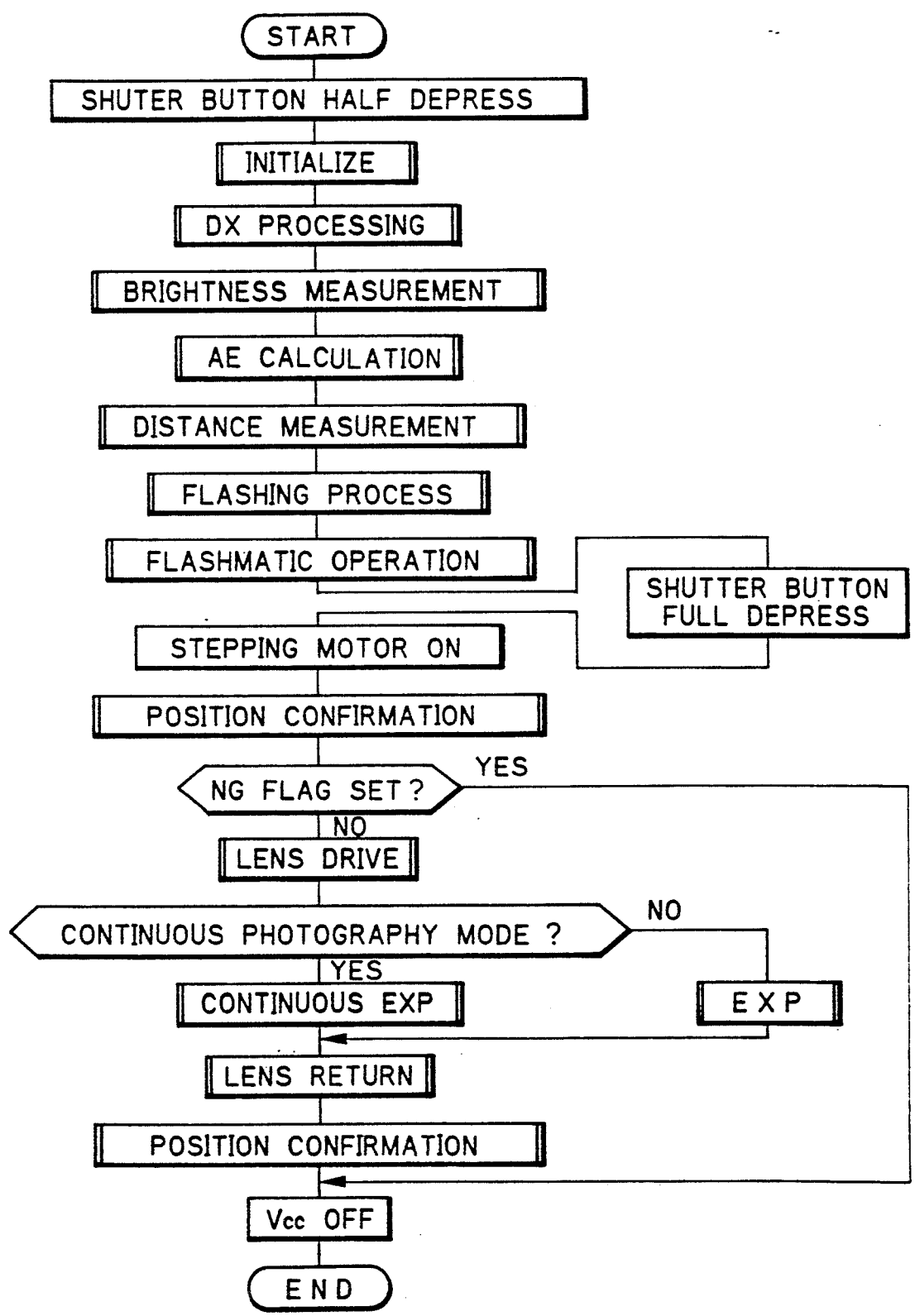
FIG. 4 is a flow chart of a subroutine for selecting a continuous photography mode.

Upon depression of the shutter button, the release switch SP is actuated to take a photograph according to the sequence of FIG. 4. The time charts thereof are shown in FIG. 5.

When the shutter button is half depressed, the camera is caused to reset unnecessary flags and other commands that have been set in the preceding photography, whereby the camera becomes ready for the next photograph. Then, DX processing is executed so as to detect the film speed and, thereafter, the brightness measuring section 2 detects subject brightness data, base don which the CPU 1 calculates an exposure value. Next, the distance measuring section 6 detects subject distance data. Furthermore, if it is determined, based on the determined exposure value, that the subject brightness is too low for daylight photography, a flash program is executed to charge the flash unit 9 and so forth. In this case, a flashmatic operation is executed to provide an optimum automatic flash considering the subject brightness and the subject distance.

Upon full depression of the shutter button, the CPU 1 starts driving the stepping motor 3 through the driver 10. At first, the stepping motor is rotated in what will be called the reverse direction to set the zoom lens 5 in the initial position, that is, the basic position from which the number of steps of the stepping motor 3 is to be counted. At the same time, it is determined whether the zoom lens 5 is set in the initial position. If not, an NG flag is set. If, in the next step, it is determined that the NG flag is set, then the power is switched off so as to interrupt the sequence.

Figure 5:
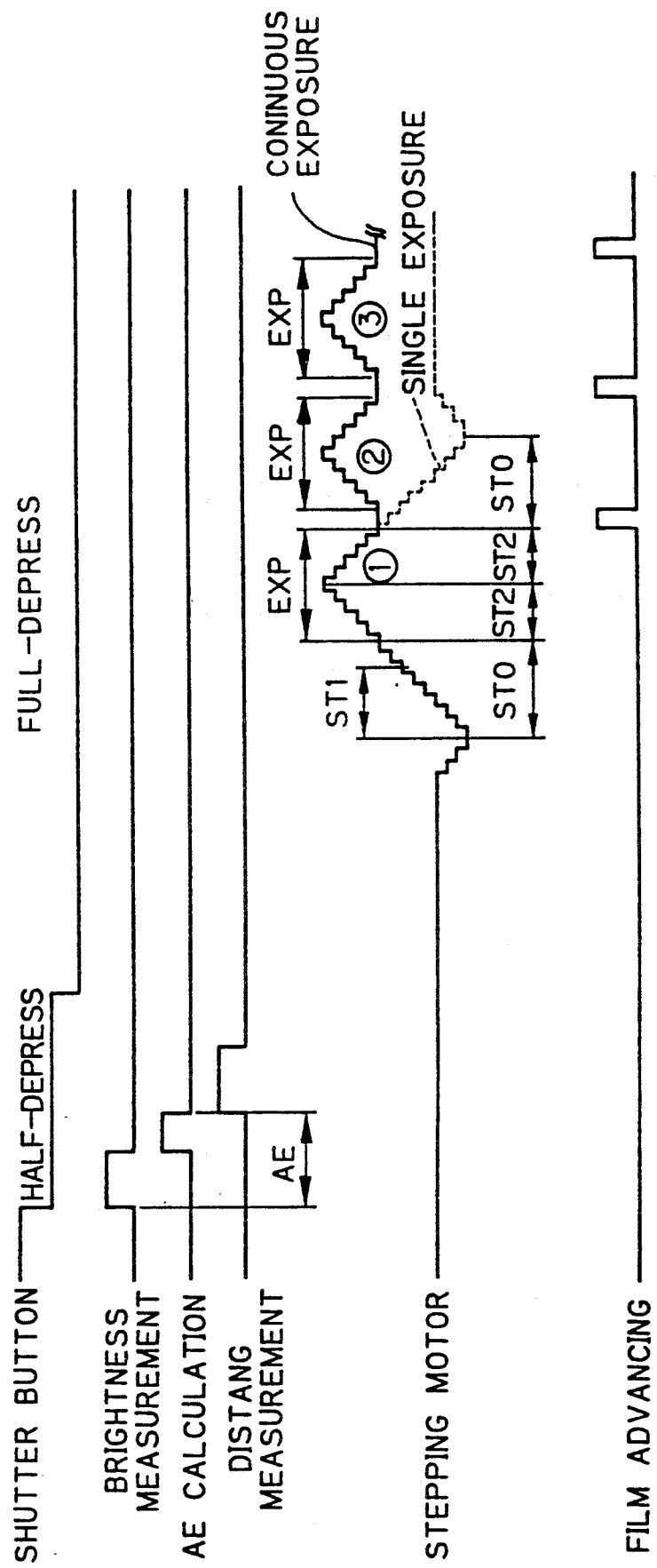
FIG. 5 is a flow chart of taking a photograph.

If no NG flag is set, the stepping motor 3 starts rotating in the forward direction by a constant number of steps ST0 from the initial position, as shown in FIG. 5. While the stepping motor rotates, the drive ring 11 rotates the cam ring 13 through the spring 12 thereby to move the zoom lens 5 from the initial position toward the determined in-focus position. When the stepping motor 3 has rotated by the decided number of steps STI, at the end of which the zoom lens 5 is in the in-focus position, then the CPU 1 actuates the lock mechanism 14 to stop the rotation of the cam ring 13, thereby to stop the zoom lens 5 in the in-focus position, although the stepping motor 3 continuous to rotate for a total number of steps ST0.

When the lens drive stroke (ST0) of the stepping motor 3 is terminated, then a shutter drive stroke (ST2) is started. In the shutter drive stroke, the drive ring 11 rotates the shutter drive ring of the shutter 4 in a conventional manner so as to open the shutter. When the stepping motor 3 has rotated by the decided number ST2 of steps of the shutter drive stroke, that is, by ST2 steps following the ST0 steps of the lens drive stroke in the forward direction, the rotational direction of the stepping motor 3 is reversed, thereby to start closing the shutter 4.

If the camera is set in the normal photography mode in which a single exposure is to be performed for each shutter button operation, the stepping motor 3 is then rotated in the reverse direction by ST2 steps so as to close the shutter and further by ST0 steps so as to return the lens to the initial position.

If, on the other hand, the camera is set in the continuous photography mode, the stepping motor 3 is rotated in the reverse direction by ST2 steps so as to close the shutter 4. Upon having rotated reversely by ST2 steps, the stepping motor 3 begins to rotate forwardly so as again to open the shutter 4. In this second exposure operation, the stepping motor 3 also rotates forwardly by ST2 steps and thereafter reversely by ST2 steps, thereby opening and then closing the shutter 4. In this way, the stepping motor 3 actuates the shutter 4 repeatedly so as continuously to perform a previously selected number of exposures, e.g. three exposures at a constant shutter speed, while the zoom lens 5 is maintained in the decided in-focus position corresponding to STI steps forward from the initial or basic position. After the last exposure, the stepping motor 3 is rotated by ST0 steps further to the ST2 steps of rotation in the reverse direction, so as to return the zoom lens 5 to the initial position, in the same way as described with respect to the single exposure operation.

When the lens return stroke is terminated in either mode, the determination whether the zoom lens 5 has actually returned to the initial position is carried out, and, if not, an NG flag is set.

In this way, pictures are repeatedly taken upon each shutter button operation in the continuous photography mode as the film is advanced one frame after each exposure in the continuous photography mode, as shown in FIG. 5. It is, of course, possible to make a multiple exposure in the continuous photography mode by preventing film advance during continuous photography.

It is desirable to display by the LCD 8 that the camera is set in the continuous photography mode along with the number of continuous exposures, so that the user can know the present condition for the camera.

Although the invention has been described in detail above with reference to the embodiments shown in the drawings, it will be understood that the invention is not limited by those embodiments; rather, various modifications can be effected within the spirit and scope of the appended claims.

What is claimed is:

1. A control method for a camera having a motor for driving a shutter as well as a taking lens, comprising performing a single exposure by performing the following sequence of steps:

(a) a first step of moving said taking lens from an initial position toward an in-focus position for focusing while said motor is rotating by a rotational amount RM1 in a first direction;

(b) a second step of opening said shutter by rotating said motor further by a rotational amount RM2 in said first direction, wherein the aperture size of said shutter is set in accordance with said amount RM2;

(c) a third step of closing said shutter by rotating said motor by said amount RM2 in a second direction; and (d) a fourth step of returning said taking lens to said initial position by rotating said motor by said amount RM1 in said second direction; and performing continuous photography by performing the following sequence of steps:

(e) executing said first to third steps for a first exposure;

(f) repeating said second and third steps alternately for a second and following exposures, thereby to open and close said shutter without moving said taking lens for focusing; and (g) executing said fourth step of returning said taking lens to said initial position after a last exposure.

2. A control method as define din claim 1, wherein single exposure or continuous photography is selected by operating a mode changeover switch.

3. A control method as defined in claim 2, further comprising the step of selecting the number of exposures to be continuously performed during said continuous photography.

4. A control method as defined in claim 3, wherein said selecting step is executed using a telephoto or a wide-angle switch such that a count value corresponding to the number of continuous exposures is counted up or down, respectively, by actuating said telephoto or said wide-angle switch simultaneously with said mode changeover switch, said telephoto switch and said wide-angle switch being used to change the focal length of said taking lens when actuated along.

5. A control method as defined in claim 4, wherein said count value is set at a predetermined value unless said telephoto or said wide-angle switch is actuated.

6. A control method as defined in claim 2, wherein said rotational amount RM1 is a constant amount, and said taking lens is locked to stop focusing motion when said motor has rotated by an amount RM3 corresponding to said in-focus position, said amount RM3 being not more than said amount RM1.

7. A control method as defined in claim 2, said continuous exposure further comprising a first film advancing step for advancing a photographic film one frame after each exposure thereby to take a series of pictures, and a second film advancing step for advancing said photographic film one frame after the selected number of continuous exposures for multiple exposure.

8. An apparatus of continuous photography using a camera having a taking lens, comprising:

an autofocus system for detecting subject distance data and determining an in-focus position of said taking lens;

a motor for moving said taking lens from an initial position to said in-focus position and for returning said taking lens to said initial position after exposure, as well as for opening and closing a shutter for exposure; and switch means for setting and resetting a continuous photography mode in which a plurality of exposures are continuously and successively performed upon an actuation of a shutter release switch, wherein when said continuous photography mode is set, said motor is actuated such that said shutter is opened and closed a plural number of times following the focusing of said taking lens before said taking lens is returned to the initial position.

9. An apparatus as defined in claim 8, further comprising means selectively to change the number of exposures to be continuously performed.

10. An apparatus as defined in claim 8, wherein said camera is a variable focal length camera, and a telephoto switch and a wide-angle switch are provided for focal length changing of said taking lens, either said telephoto switch or said wide-angle switch being sued to change the number of continuous exposures when actuated simultaneously with said switch means.

11. An apparatus as defined in claim 8, wherein said motor is coupled to said shutter and said taking lens through a power transmitting mechanism, and transmission of rotational power from said motor to said taking lens is disabled when said taking lens is moved into said in-focus position.

12. An apparatus as defined in claim 8, wherein said motor is a stepping motor, and begins to actuate said shutter after rotating by a constant number steps from a predetermined basic position.

13. An apparatus as defined in claim 10, wherein a lens drive motor actuated by said telephoto or wide-angle switch for focal length changing is provided, said lens drive motor being sued also to transport a photographic film.

14. A control apparatus for a camera having a motor for driving a shutter as well as a taking lens, comprising means for performing a single exposure comprising:
  (a) means for performing a first step of moving said taking lens from an initial position toward an in-focus position for focusing while said motor is rotating by a rotational amount RM1 in a first direction;
  (b) means for performing a second step of opening said shutter by rotating said motor further by a rotational amount RM2 in said first direction, wherein the aperture size of said shutter is set in accordance with said amount RM2;
  (c) means for performing a third step of closing said shutter by rotating said motor by said amount RM2 in a second direction; and
  (d) means for performing a fourth step of returning said taking lens to said initial position by rotating said motor by said amount RM1 in said second direction; and
  (e) means for performing continuous photography, comprising means for repeating said second and third steps alternately for a second and following exposures, thereby to open and close said shutter without moving said taking lens for focusing.

* * * * *